(12) United States Patent
Li et al.

(10) Patent No.: US 12,030,643 B2
(45) Date of Patent: Jul. 9, 2024

(54) AIRCRAFT SEAT BACKREST WITH LIFESAVING FUNCTION

(71) Applicant: AEROSPACE LIFE-SUPPORT INDUSTRIES LTD, Hubei (CN)

(72) Inventors: Liangliang Li, Hubei (CN); Bin Xiong, Hubei (CN); Xi Cheng, Hubei (CN); Fanhui Meng, Hubei (CN); Zhaojiang Wu, Hubei (CN); Chunli Huang, Hubei (CN)

(73) Assignee: AEROSPACE LIFE-SUPPORT INDUSTRIES LTD, Hubei (CN)

( * ) Notice: Subject to any disclaimer, the term of this patent is extended or adjusted under 35 U.S.C. 154(b) by 99 days.

(21) Appl. No.: 17/773,052

(22) PCT Filed: Sep. 30, 2020

(86) PCT No.: PCT/CN2020/119481
§ 371 (c)(1),
(2) Date: Apr. 29, 2022

(87) PCT Pub. No.: WO2021/082870
PCT Pub. Date: May 6, 2021

(65) Prior Publication Data
US 2023/0257122 A1    Aug. 17, 2023

(30) Foreign Application Priority Data
Oct. 29, 2019   (CN) .......................... 201911038507.5
Oct. 29, 2019   (CN) .......................... 201921834323.5

(51) Int. Cl.
*B64D 11/06*   (2006.01)

(52) U.S. Cl.
CPC .............................. *B64D 11/0633* (2014.12)

(58) Field of Classification Search
CPC .................. B64D 11/0633; B64D 11/0627
See application file for complete search history.

(56) References Cited

U.S. PATENT DOCUMENTS 6,629,671 B1 *  10/2003  Hilsenbeck ........ B64D 11/0629
                                                      244/148

FOREIGN PATENT DOCUMENTS

CN         105438480        3/2016
CN         106956779        7/2017
(Continued)

OTHER PUBLICATIONS

"International Search Report (Form PCT/ISA/210) of PCT/CN2020/119481", mailed on Dec. 31, 2020, with English translation thereof, pp. 1-6.

*Primary Examiner* — Tye William Abell
(74) *Attorney, Agent, or Firm* — JCIPRNET

(57) ABSTRACT

An aircraft seat backrest with a lifesaving function, including a backrest body and a back plate assembly, wherein a containing cavity is arranged in a front face of the backrest body, the back plate assembly includes a back plate covering the containing cavity and a lifesaving parachute pack that is arranged on a back face of the back plate and contained in the containing cavity, the back plate is fixedly connected with the backrest body through a quick release mechanism in a quickly separable manner, lifesaving straps of the lifesaving parachute pack pass through strap through holes in the back plate, and an occupant leans against the back plate and is connected with the back plate and the lifesaving parachute pack through the lifesaving straps when riding.

8 Claims, 4 Drawing Sheets

(56) References Cited

FOREIGN PATENT DOCUMENTS

| | | | |
|---|---|---|---|
| CN | 110654550 | 1/2020 | |
| CN | 210793659 | 6/2020 | |
| GB | 950760 | 2/1964 | |
| GB | 950760 A * | 2/1964 | ............ B64D 11/06 |
| JP | H0481394 | 3/1992 | |
| RU | 175785 | 12/2017 | |

* cited by examiner

AIRCRAFT SEAT BACKREST WITH LIFESAVING FUNCTION

CROSS-REFERENCE TO RELATED APPLICATION

This application is a 371 of international application of PCT application serial no. PCT/CN2020/119481, filed on Sep. 30, 2020, which claims the priority benefit of China applications no. 201911038507.5 and 201921834323.5, filed on Oct. 29, 2019. The entirety of each of the above mentioned patent applications is hereby incorporated by reference herein and made a part of this specification.

FIELD

The present disclosure belongs to the field of aviation protection, and particularly relates to an aircraft seat backrest with a lifesaving function.

BACKGROUND

At present, domestic lifesaving parachutes used by falling-suitable seats capable of containing lifesaving parachute packs are all sitting type lifesaving parachutes. A seat pan is designed for a seat, a lifesaving parachute pack is placed in the seat pan, and a pilot sits on the lifesaving parachute pack and wears lifesaving straps, so that the pilot can get up to a parachuting exit in emergency.

The existing sitting type lifesaving parachute has the following problems: 1) the lifesaving parachute pack is placed in the seat pan, and the lifesaving straps connected with the lifesaving parachute pack are worn on the body of the pilot, so that the shoulder of the pilot is more seriously pressed to increase the fatigue of the pilot during long-time flight; 2) when the pilot needs to rapidly move in a cabin during airborne emergency, the lifesaving parachute pack is located at the thighs of the pilot, possibly resulting in hooking between the lifesaving parachute pack and other devices in the cabin; and 3) the position where the lifesaving parachute pack is connected with the body of the pilot can affect the power generated when the pilot needs to rapidly move, so that the emergency off-plane time is affected, causing serious consequences.

SUMMARY

An objective of the present disclosure is to provide an aircraft seat backrest with a lifesaving function, wherein a sitting type lifesaving parachute is changed into a back type lifesaving parachute, a passenger can quickly move in a cabin during airborne emergency, the shoulder of the passenger cannot be pressed, and the hooking with other devices cannot occur.

The technical solution adopted by the present disclosure is as follows.

An aircraft seat backrest with a lifesaving function includes a backrest body and a back plate assembly, wherein a containing cavity is arranged in a front face of the backrest body, the back plate assembly includes a back plate covering the containing cavity and a lifesaving parachute pack that is arranged on a back face of the back plate and contained in the containing cavity, the back plate is fixedly connected with the backrest body through a quick release mechanism in a quickly separable manner, lifesaving straps of the lifesaving parachute pack pass through strap through holes in the back plate, and an occupant leans against the back plate and is connected with the back plate and the lifesaving parachute pack through the lifesaving straps when riding.

Further, the quick release mechanism includes an upper connecting ring arranged on each of two sides of an upper part of the back plate, a lower connecting ring arranged on each of two sides of a lower part of the back plate, a locking piece arranged on each of two sides of an upper part of the backrest body and a positioning piece arranged on each of two sides of a lower part of the backrest body, wherein the locking piece includes a lock shell fixed on the backrest body, a locking pin capable of sliding up and down in the lock shell, a spring enabling the locking pin to press an end part of the lock shell, and a pull rope connected with the locking pin, and the positioning piece includes a transverse rotating shaft arranged on the backrest body and a positioning pin vertically fixed on the transverse rotating shaft; and during riding, the positioning pin is inserted into the lower connecting ring, the connecting ring extends into the lock shell, the locking pin is inserted into the upper connecting ring, the back plate and the backrest body are fixed, the locking pin retreats from the upper connecting ring when the pull rope is pulled downwards, the lower connecting ring is naturally separated from the positioning pin after an occupant inclines forwards and gets up, and the back plate is separated from the backrest body.

Further, one side of a top of the locking pin is an inclined plane, and after the upper connecting ring pushes the locking pin to move downwards to the bottom through the inclined plane, the locking pin is inserted into the upper connecting ring.

Further, a pair of lug-shaped bosses is arranged on the transverse rotating shaft, and can limit a rotating angle of the transverse rotating shaft.

Further, the end part of the lock shell is sealed through a plug screw.

Further, a lower end of the locking pin is connected with a connecting block through a pin, an empty groove is formed in the connecting block, a ball end is arranged at an end part of the pull rope, is located in the empty groove and is blocked by the locking pin, and the pull rope passes through the empty groove.

Further, the back plate assembly further includes a parachuting oxygen supply device that is installed below the lifesaving parachute pack on the back face of the back plate through supports and hoops, and is contained in the containing cavity during riding.

Further, a hole for allowing a pipeline of the parachuting oxygen supply device and an on-off device of the pipeline of the parachuting oxygen supply device to pass and a hole for displaying and observing the pressure of the parachuting oxygen supply device are formed in the back plate.

Further, a storage groove is formed in a lower part of a back face of the backrest body, contains smoke-proof goggles, and is sealed through a storage groove coat and a nylon fastener tape.

Further, a square frame is arranged on the back face of the back plate, and the lifesaving parachute pack is arranged in the square frame in a matched manner.

The present disclosure has the following beneficial effects:

According to the present disclosure, a sitting type lifesaving parachute is changed into a back type lifesaving parachute, so that a passenger can quickly move in a cabin during airborne emergency and can quickly parachute to be off the aircraft, the shoulder of the passenger cannot be pressed, and the lifesaving parachute pack cannot be hooked with other devices; and the seat backrest can be connected with a seat base, can be widely applied to seats, needing to be equipped with lifesaving parachute packs and parachuting oxygen supply devices, for pilots of transport planes, operators, aeronavigators and the like, is easy to apply and popularize and has a broad prospect.

Figure 1:
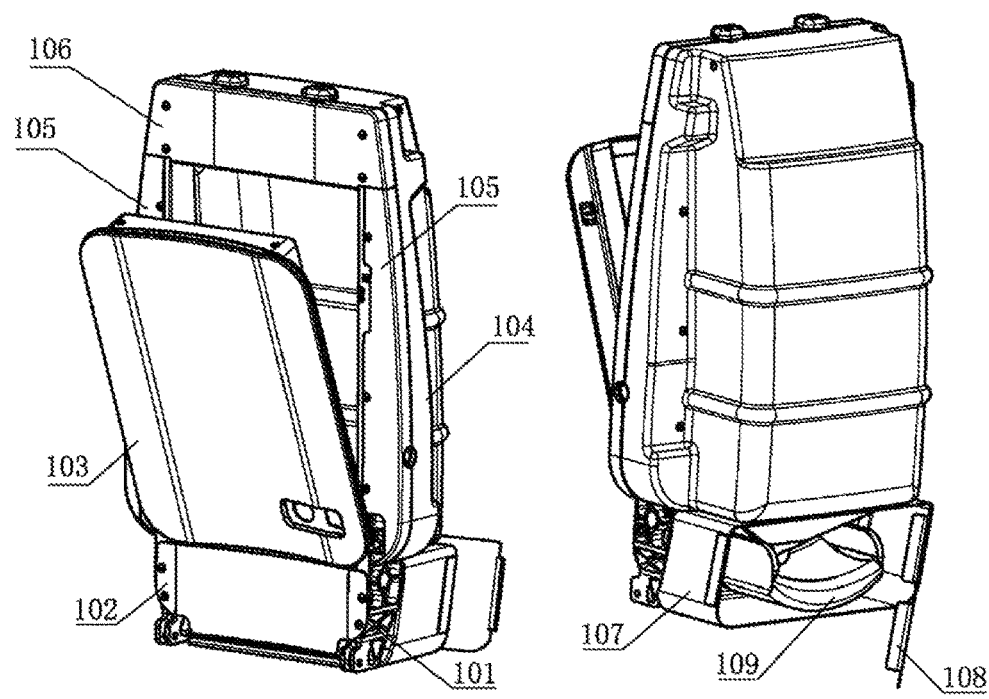
FIG. 1 is an overall schematic diagram of an embodiment of the present disclosure.

In the drawings, main framework (101), lower baffle (102), back plate assembly (103), rear decoration cover (104), side baffle (105), upper baffle (106), storage groove (107), storage groove coat (108), smoke-proof goggles (109), headrest clamping seat (201), cross beam (202), locking piece (203), vertical beam (204), pull rope (205), armrest supporting piece (206), positioning piece (207), supporting plate (208), transverse rotating shaft (209), positioning pin (210), plug screw (301), lock shell (302), locking pin (303), spring (304), connecting block (305), upper connecting ring (401), back plate (402), lower connecting ring (403), support (404), hoop (405), back cushion (406), parachuting oxygen supply device (407), lifesaving parachute pack (408).

DETAILED DESCRIPTION OF THE EMBODIMENTS

The present disclosure is further described below in combination with accompanying drawings and embodiments.

As shown in FIG. 1, in the embodiment, an aircraft seat backrest with a lifesaving function includes a main framework (101), a lower baffle (102), a back plate assembly (103), a rear decoration cover (104), side baffles (105), an upper baffle (106), a storage groove (107) and a storage groove coat (108). The rear decoration cover (104), the storage groove (107), the upper baffle (106), the side baffles (105) and the lower baffle (102) are fixed on the main framework (101). A containing cavity is formed by the rear decoration cover (104), the upper baffle (106) and the main framework (101), and contains a lifesaving parachute pack and a parachuting oxygen supply device. The back plate assembly (103) is a movable part and can be conveniently installed on and detached from the main framework (101). A containing cavity is formed by the lower baffle (102), the storage groove (107) and the storage groove coat (108) and can be used for containing smoke-proof goggles (109). The storage groove coat (108) is adhered to the storage groove (107) through a nylon fastener tape and can be conveniently adhered and torn off. When a pilot sits on a seat, if the smoke-proof goggles (109) need to be taken, the pilot can put a single hand back around the seat backrest and tears off the storage groove coat (108) to take the smoke-proof goggles.

Figure 2:
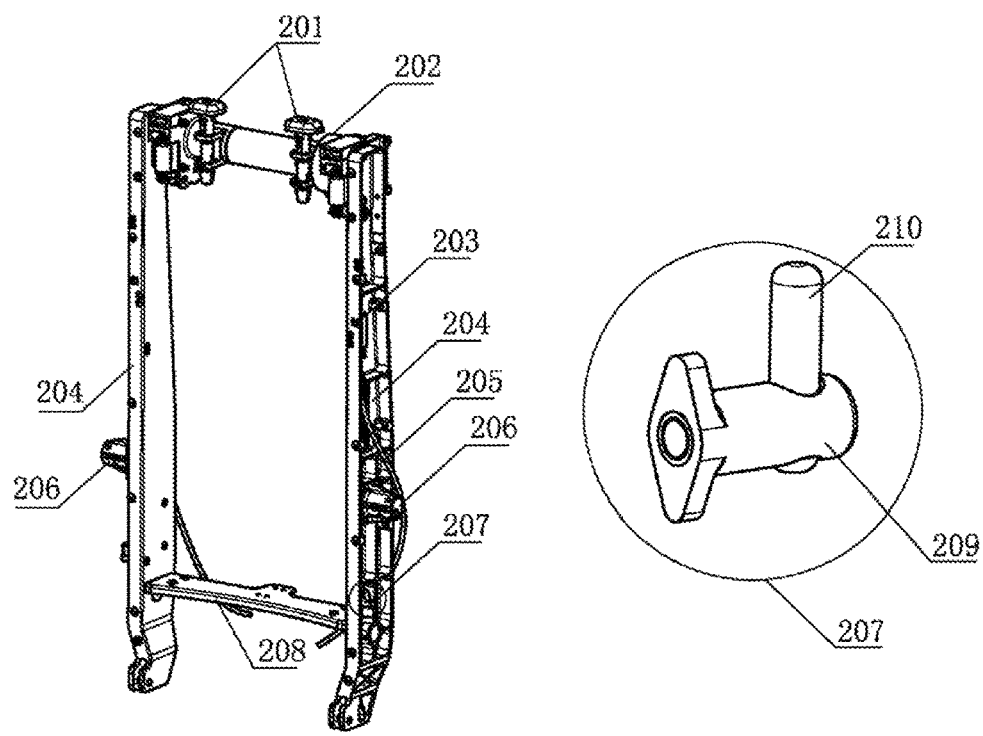
FIG. 2 is a schematic diagram of a main framework in an embodiment of the present disclosure.

As shown in FIG. 2, in this embodiment, the main framework (101) includes headrest clamping seats (201), a cross beam (202), locking pieces (203), vertical beams (204), pull ropes (205), armrest supporting pieces (206), positioning pieces (207) and a supporting plate (208). The main framework (101) is a main force bearing part of the backrest, the positioning pieces (207) are composed of transverse rotating shafts (209) and positioning pins (210), and the transverse rotating shafts (209) and the positioning pins (210) are fixedly connected and cannot move relatively; each of the transverse rotating shaft (209) is provided with a pair of lug-shaped bosses which can limit a rotating angle of a locking knob, and the positioning pins (210) can be locked with lower connecting rings (403 in FIG. 4) in a matched manner.

Figure 3:
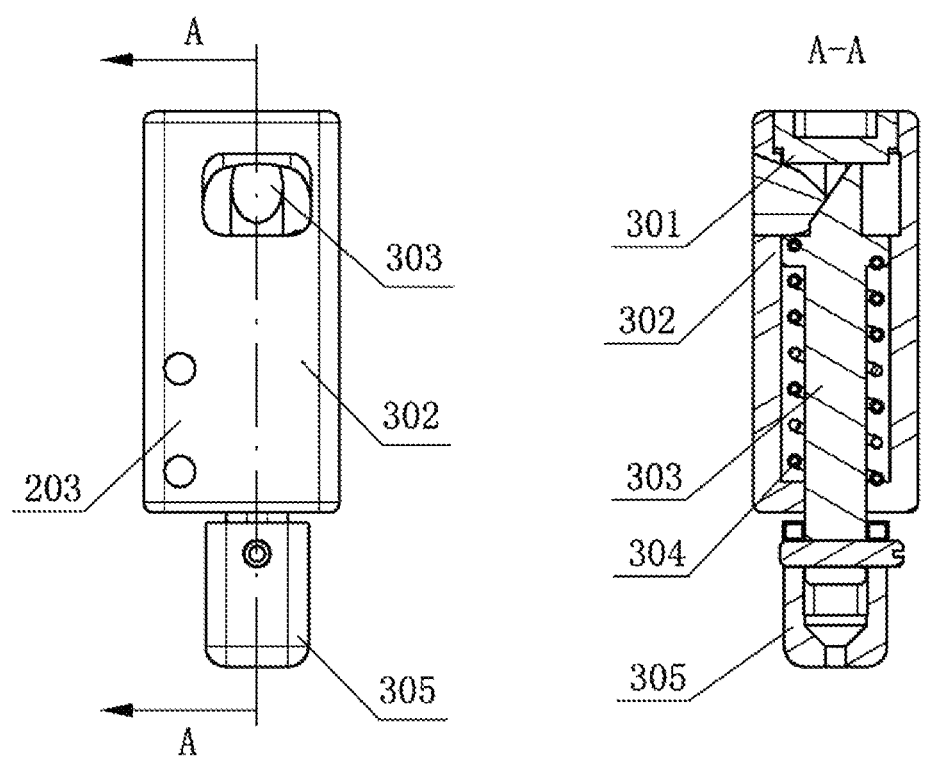
FIG. 3 is a schematic diagram of a locking piece in an embodiment of the present disclosure.

As shown in FIG. 3, in the embodiment, the locking pieces (203) include plug screws (301), lock shells (302), locking pins (303), springs (304) and connecting blocks (305), wherein the lock shells (302) and the vertical beams (204) are fixedly connected and cannot move relatively; the locking pins (303) are in clearance fit with the lock shells (302), and can move up and down, and diagonal planes are formed at upper ends of the locking pins (303), so that upper connecting rings (401 in FIG. 4) can be conveniently locked with the locking pieces (203). After the locking pins (303) and the springs (304) are installed from upper parts of the lock shells (302), the plug screws (301) are screwed into threaded holes in the upper parts of the lock shells (302) for sealing, and the connecting blocks (305) is fixedly connected with the locking pins (303) after ball ends of the pull ropes are installed in the connecting block (305). After the pull ropes are pulled, the connecting blocks (305) and the locking pins (303) move downwards, so that the upper connecting rings (401 in FIG. 5) are separated from the locking pins (303).

Figure 4:
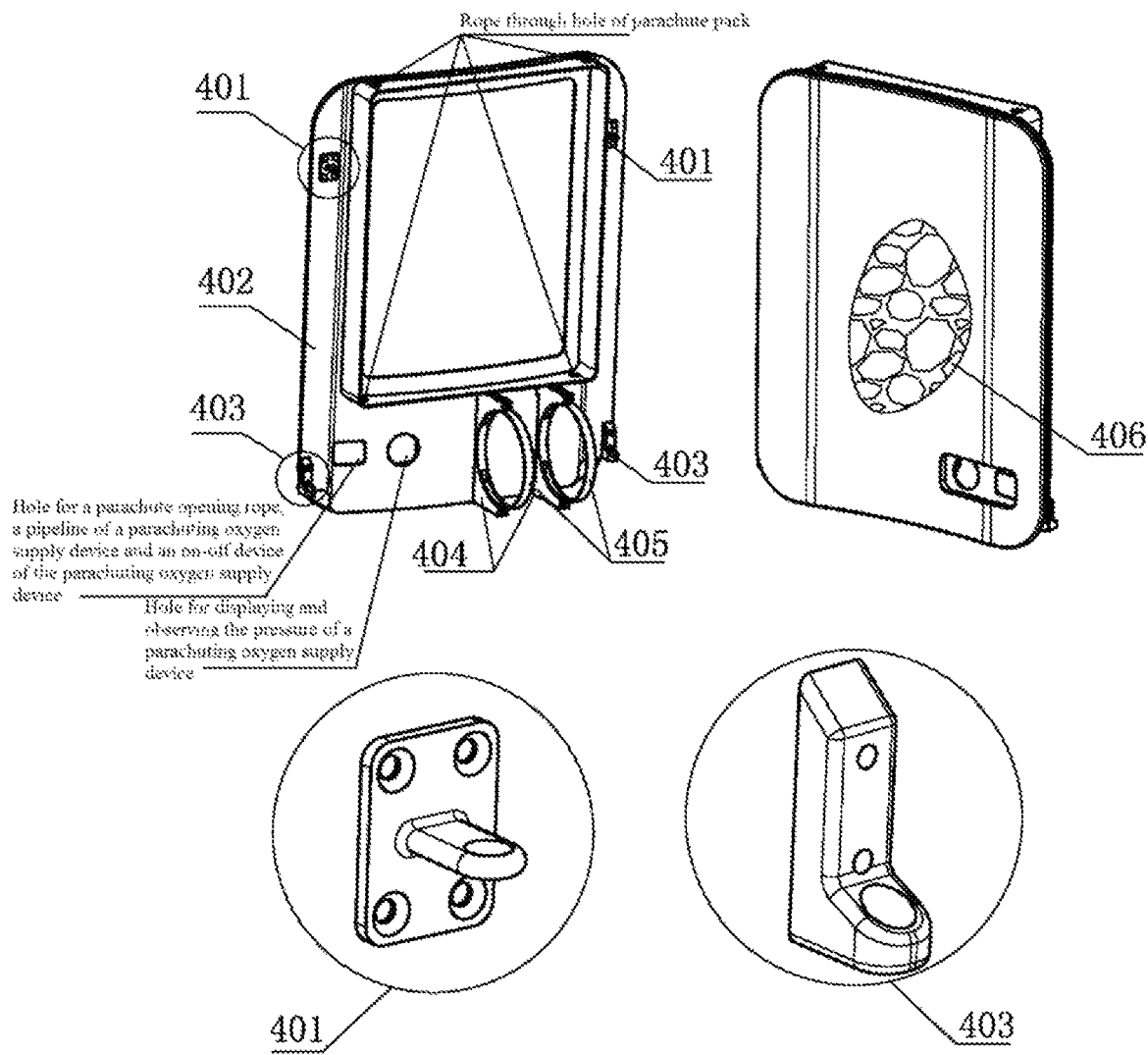
FIG. 4 is a schematic diagram of a back plate assembly in an embodiment of the present disclosure.

As shown in FIG. 4, the back plate assembly (103) includes upper connecting rings (401), a back plate (402), lower connecting rings (403), supports (404), hoops (405) and a back cushion (406), wherein the upper connecting rings (401), the lower connecting rings (403) and the supports (404) are fixed on the back plate (402). The back plate (402) is provided with ports (strap through holes) for fixing the lifesaving parachute pack, a square frame in the back of the back plate (402) has a four-direction restraining effect on the lifesaving parachute pack, and a hole for allowing a parachute opening rope, a pipeline of the parachuting oxygen supply device and an on-off device of the pipeline of the parachuting oxygen supply device to pass and a hole for displaying and observing the pressure of the parachuting oxygen supply device are formed in a lower part of the back plate (402). Aircraft ground crew can confirm a pressure value of the parachuting oxygen supply device through the hole. Holes in the upper connecting rings (401) can be locked with the locking pieces (203 in FIG. 2), and holes in the lower connecting rings (403) can be locked with the positioning pins (210 in FIG. 2) in the positioning pieces (207 in FIG. 2) in a matched manner.

Figure 5:
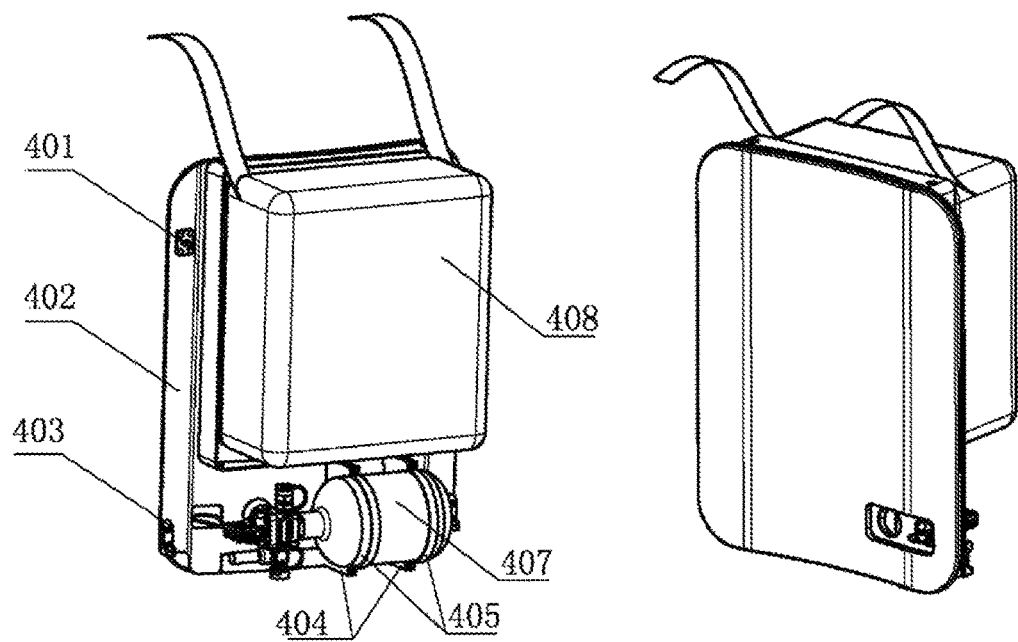
FIG. 5 is a schematic diagram of installation of a lifesaving parachute pack and a parachuting oxygen supply device in an embodiment of the present disclosure.

As shown in FIG. 5, straps extending from four corners of the lifesaving parachute pack (408) are knotted after passing through the strap through holes, so that the lifesaving parachute pack (408) can be connected with the back plate (402); and after the hoops (405) are connected with the supports (404), the parachuting oxygen supply device (407) can be fixed on the back plate (402).

Figure 6:
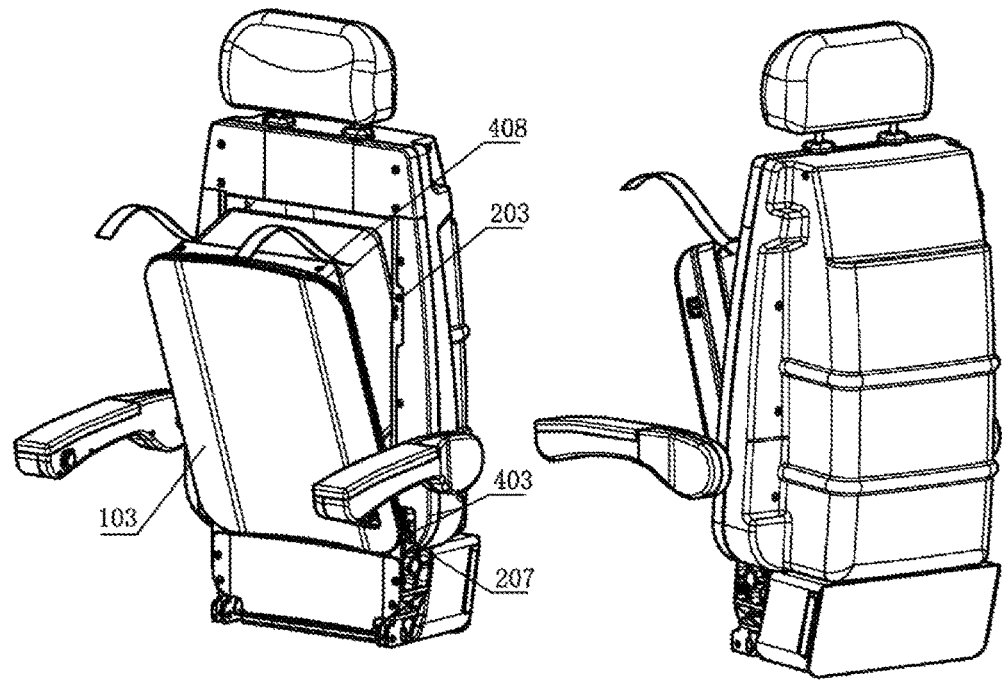
FIG. 6 is a schematic diagram after the addition of armrests and a headrest in an embodiment of the present disclosure.

As shown in FIG. 6, the headrest clamping seats (201 in FIG. 2) can be connected with the main framework (101) and a seat headrest, the armrest supporting pieces (206 in FIG. 2) can be connected with the main framework (101) and seat armrests, and a complete seat backrest is formed.

After being fixed to the back plate assembly (103), the lifesaving parachute pack (408) and the parachuting oxygen supply device (407 in FIG. 5) can be rapidly fixed in the containing cavity of the seat backrest. The specific operations are as follows: the positioning pieces (207) are adjusted to form an 30°-60° angle with a vertical plane, and an angle of the back plate assembly (103) is adjusted to be roughly the same as that of the positioning pieces (207); waist locking holes of the lower connecting rings (403) on the back plate assembly (103) are clamped with the positioning pieces (207); a certain pushing force is applied to the upper part of the back plate assembly (103); shoulder locking holes of the upper connecting rings (401 in FIG. 4) are clamped with the locking pieces (203); and at the moment, the lifesaving parachute pack (408) and the parachuting oxygen supply device (407 in FIG. 5) are fixed in the containing cavity of the seat backrest by the back plate assembly (103) under a combined action of the locking pieces (203) and the positioning pieces (207).

When a pilot leaves the aircraft during airborne emergency, after the pull ropes (205 in FIG. 2) are pulled, the locking pins (303 in FIG. 3) in the locking pieces (203 in FIG. 2) are driven to move downwards and are separated from the shoulder locking holes of the upper connecting rings (401) on the back plate; at the moment, the back plate assembly (103) can rotate by taking the transverse rotating shafts (209 in FIG. 2) on the positioning pieces (207) as axes; the waist locking holes of the lower connecting rings (403) on the back plate are separated from the positioning pins (210 in FIG. 2) in the positioning pieces (207) by virtue of a subconscious action that the body inclines forwards and upwards when the pilot gets up and leaves from the seat as the pilot wears the straps (that are connected with the lifesaving parachute pack), so that the back plate assembly (103) is quickly and completely separated from the seat backrest. Therefore, the pilot can carry the lifesaving parachute pack (408) and the parachuting oxygen supply device (407) to be quickly away from the restraint of the seat (the lifesaving parachute pack and the parachuting oxygen supply device are reliably fixed on the back plate assembly in the whole course), and moves to a boarding gate to parachute to be off the aircraft.

According to the present disclosure, a sitting type lifesaving parachute is changed into a back type lifesaving parachute, so that a passenger can quickly move in a cabin during airborne emergency and can quickly parachute to be off the aircraft, the shoulder of the passenger cannot be pressed, and the lifesaving parachute pack cannot be hooked with other devices; and the backrest of the seat can be connected with the seat base, can be widely applied to seats, needing to be equipped with lifesaving parachute packs and parachuting oxygen supply devices, for pilots of transport planes, operators, aeronavigators and the like, and is easy to apply and popularize and has a broad prospect.

It should be understood that those of ordinary skill in the art can make improvements or transformations according to the description, and all these improvements and transformations should fall within the scope of protection of the attached claims of the present disclosure.

What is claimed is:

1. An aircraft seat backrest with a lifesaving function, comprising:
   a backrest body wherein a containing cavity is arranged in a front face of the backrest body;
   a quick release mechanism;
   a back plate assembly, wherein the back plate assembly comprises:
      a back plate covering the containing cavity, wherein the back plate is fixedly connected with the backrest body through the quick release mechanism in a separable manner; and
      a lifesaving parachute pack that is arranged on a back face of the back plate and contained in the containing cavity, wherein lifesaving straps of the lifesaving parachute pack pass through strap through holes in the back plate,
      wherein the back plate assembly further comprises a parachuting oxygen supply device that is installed below the lifesaving parachute pack on the back face of the back plate through supports and hoops, and is contained in the containing cavity during riding,
      wherein a hole for allowing a pipeline of the parachuting oxygen supply device and an on-off device of the pipeline of the parachuting oxygen supply device to pass and a hole for displaying and observing the pressure of the parachuting oxygen supply device are formed in the back plate.

2. The aircraft seat backrest with the lifesaving function according to claim 1, wherein a storage groove is formed in a lower part of a back face of the backrest body, contains smoke-proof goggles, and is sealed through a storage groove coat and a nylon fastener tape.

3. The aircraft seat backrest with the lifesaving function according to claim 1, wherein the quick release mechanism comprises:
   an upper connecting ring arranged on each of two sides of an upper part of the back plate;
   a lower connecting ring arranged on each of two sides of a lower part of the back plate;
   a locking piece arranged on each of two sides of an upper part of the backrest body, wherein the locking piece includes a lock shell fixed on the backrest body, a locking pin capable of sliding up and down in the lock shell, a spring enabling the locking pin to press an end part of the lock shell, and a pull rope connected with the locking pin; and
   a positioning piece arranged on each of two sides of a lower part of the backrest body, wherein the positioning piece comprises a transverse rotating shaft arranged on the backrest body and a positioning pin vertically fixed on the transverse rotating shaft, wherein
   the positioning pin is inserted into the lower connecting ring, the connecting ring extends into the lock shell, the locking pin is inserted into the upper connecting ring, the back plate and the backrest body are fixed, the locking pin retreats from the upper connecting ring when the pull rope is pulled downwards, the lower connecting ring is separated from the positioning pin, and the back plate is separated from the backrest body.

4. The aircraft seat backrest with the lifesaving function according to claim 3, wherein one side of a top of the locking pin is an inclined plane, and after the upper connecting ring pushes the locking pin to move downwards to the bottom through the inclined plane, the locking pin is inserted into the upper connecting ring.

5. The aircraft seat backrest with the lifesaving function according to claim 2, wherein a pair of lug-shaped bosses is arranged on the transverse rotating shaft, and capable of limiting a rotating angle of the transverse rotating shaft.

6. The aircraft seat backrest with the lifesaving function according to claim 3, wherein the end part of the lock shell is sealed through a plug screw.

7. The aircraft seat backrest with the lifesaving function according to claim 3, wherein a lower end of the locking pin is connected with a connecting block through a pin, an empty groove is formed in the connecting block, a ball end is arranged at an end part of the pull rope, is located in the empty groove and blocked by the locking pin, and the pull rope passes through the empty groove.

8. The aircraft seat backrest with the lifesaving function according to claim 1, wherein a square frame is arranged on the back face of the back plate, and the lifesaving parachute pack is arranged in the square frame in a matched manner.

* * * * *